(12) United States Patent
Zhang et al.

(10) Patent No.: US 12,525,590 B2
(45) Date of Patent: Jan. 13, 2026

(54) DISPLAY DEVICE

(71) Applicant: Wuhan China Star Optoelectronics Technology Co., Ltd., Hubei (CN)

(72) Inventors: Zhou Zhang, Hubei (CN); Guowei Zha, Hubei (CN); Guanghui Liu, Hubei (CN); Zhifu Li, Hubei (CN); Xiaolin Yan, Hubei (CN); Wanliang Feng, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 1092 days.

(21) Appl. No.: 17/612,235

(22) PCT Filed: Sep. 17, 2021

(86) PCT No.: PCT/CN2021/119108
§ 371 (c)(1),
(2) Date: Mar. 16, 2023

(87) PCT Pub. No.: WO2023/035310
PCT Pub. Date: Mar. 16, 2023

(65) Prior Publication Data
US 2024/0038745 A1 Feb. 1, 2024

(30) Foreign Application Priority Data

Sep. 7, 2021 (CN) .......................... 202111043819.2

(51) Int. Cl.
*H01L 25/16* (2023.01)
*H01L 23/00* (2006.01)

(52) U.S. Cl.
CPC ............ *H01L 25/167* (2013.01); *H01L 24/05* (2013.01); *H01L 24/32* (2013.01); *H01L 2224/05573* (2013.01); *H01L 2224/32148* (2013.01)

(58) Field of Classification Search
CPC ....... G09G 2370/025; G09G 2370/042; G09G 2300/026; G09G 5/003; G09G 5/006
See application file for complete search history.

(56) References Cited

U.S. PATENT DOCUMENTS

2007/0045626 A1   3/2007  Murade
2010/0134384 A1*  6/2010  Kim ...................... G06F 3/1431
                                                             348/E7.003

FOREIGN PATENT DOCUMENTS

| CN | 102156565 |   | 8/2011  |              |
|----|-----------|---|---------|--------------|
| CN | 102156565 | A * | 8/2011 | ........... G06F 3/0412 |
| CN | 104966480 |   | 10/2015 |              |
| CN | 107422502 |   | 12/2017 |              |
| CN | 108172193 |   | 6/2018  |              |

(Continued)

*Primary Examiner* — Edward Chin (57) ABSTRACT

A display device is provided and includes: a plurality of display modules disposed on the first bearing surface, each of the display modules including a plurality of display units; a plurality of first functional elements located on the first bearing surface, and each of the first functional elements disposed between any two of the display units; and a plurality of second functional elements located on the second bearing surface; wherein a function of each of the second functional elements is the same as a function of each of the first functional elements, and processing capability of each of the second functional elements is different from processing capability of each of the first functional elements.

19 Claims, 7 Drawing Sheets

(56) References Cited

FOREIGN PATENT DOCUMENTS

| | | |
|---|---|---|
| CN | 111627962 | 9/2020 |
| CN | 112233606 | 1/2021 |
| JP | 2016-092738 | 5/2016 |
| JP | 2018-049266 | 3/2018 |
| KR | 10-2020-0026679 | 3/2020 |

\* cited by examiner

DISPLAY DEVICE

RELATED APPLICATIONS

This application is a National Phase of PCT Patent Application No. PCT/CN2021/119108 having International filing date of Sep. 17, 2021, which claims the benefit of priority of Chinese Patent Application No. 202111043819.2 filed on Sep. 7, 2021. The contents of the above applications are all incorporated by reference as if fully set forth herein in their entirety.

FIELD AND BACKGROUND OF THE INVENTION

The present disclosure relates to the display technology field, and more particularly to a display device.

Currently, when system functions are integrated into a display area of a display panel (System On Panel, SOP), wiring and circuit design of a high-resolution SOP display device are very complicated, which increases difficulty of a manufacturing process of the high-resolution SOP display device.

Therefore, it is necessary to propose a technical solution to solve the problem that the manufacturing process of the high-resolution SOP display device has great difficulty.

An objective of the present disclosure is to provide a display device to solve the problem that the manufacturing process of the high-resolution SOP display device has great difficulty.

A display device, wherein the display device has a first bearing surface and a second bearing surface, the display device includes:
  a plurality of display modules disposed on the first bearing surface, each of the display modules configured to receive a corresponding display signal, a parameter of the display signal being smaller than or equal to a processing capability peak value of a corresponding one of the display modules, and each of the display modules including a plurality of display units;
  a plurality of first functional elements located on the first bearing surface, and each of the first functional elements disposed between any two of the display units; and
  a plurality of second functional elements located on the second bearing surface;
  wherein a function of each of the second functional elements is the same as a function of each of the first functional elements, and processing capability of each of the second functional elements is different from processing capability of each of the first functional elements.

Advantageous Effects

In the present disclosure, the display device is configured to include a plurality of distributed display modules. Each of the display modules receives a respective corresponding display signal. Each of the display modules includes a plurality of display units. Each of the first functional elements is disposed between two adjacent ones of the display units to realize functions to be integrated in the display device. A parameter of each of the display signals is smaller than or equal to a processing capacity peak value of a corresponding of the display modules to provide a distributed SOP display device with a high resolution. The first functional elements and the second functional elements with different processing capability are disposed on different bearing surfaces to simplify the manufacturing process of the high-resolution distributed SOP display device.

Numerals in the drawings are described as follows: display device 100; first substrate 10; first bearing surface 10*a*; second bearing surface 10*b*; third bearing surface 10*c*; fourth bearing surface 10*d*; display module 101; display unit 1011; first functional module 102; first functional unit 1021; first functional element 10211; second functional module 103; second functional unit 1031; second functional element 10311; third functional module 104; third functional unit 1041; fourth functional unit 1042; third functional element 10411; fourth functional element 10511; electrically conductive connector 105; electrically conductive pad 1051; flexible printed circuit board 1052; electrically conductive wire 1053; electrically conductive adhesive 1054; first pin 1061; second pin 1062; third pin 1063; fourth pin 1064; fifth pin 1065; sixth pin 1066; seventh pin 1067; eighth pin 1068; insulating layer 107; 107*a* first via; 107*b* second via; sealant 108.

DESCRIPTION OF SPECIFIC EMBODIMENTS OF THE INVENTION

The following clearly describes the technical solutions in the embodiments of the present disclosure with reference to the accompanying drawings in the embodiments of the present disclosure. The described embodiments are some rather than all of the embodiments of the present disclosure. All other embodiments obtained by those skilled in the art based on the embodiments of the present disclosure without creative efforts shall fall within the protection scope of the present disclosure.

In a display device disclosed in the present embodiment, a high-frequency external source signal (for example, an amount of data is above 3 Gbps) is split into a plurality of parallel low-frequency signals (for example, an amount of data is 10 Mbps~300 Mbps), and a distributed display panel is constituted by a plurality of display modules which receive the low-frequency signals independently and a plurality of functional modules which receive the low-frequency signals independently. At least some of the functional modules are distributedly integrated among the plurality of display modules. A parameter of each of the low-frequency signals received by a corresponding one of the display modules is smaller than or equal to a processing capability peak value of the corresponding one of the display modules, and a parameter of each of the low-frequency signals received by a corresponding one of the functional modules is smaller than or equal to a processing capability peak value of the corresponding one of the functional modules. As such, the split high-frequency signal matches splitting of a display part and splitting of a functional part to obtain a display device with a distributed system integrated on a display panel. The display device with the distributed system integrated on the display panel can process the high-frequency signal and can meet requirements that a large amount of data of a display device with a full high definition resolution or a resolution above the full high definition is required to be processed. Further, on the basis of providing a high-resolution distributed SOP display device in the present disclosure, functional elements with different processing capabilities are disposed on different bearing surfaces, so that the functional elements with the different processing capabilities can be prepared separately to simplify a manufacturing technology of the high-resolution distributed SOP display device.

It should be noted that for the high-resolution distributed SOP display device, when a signal frequency of the high-frequency signal is fixed and a number of display units included in the display panel is fixed, the splitting of the high-frequency signal, the splitting of the display part, and the splitting of the functional part need to be matched. The splitting of the high-frequency signal, the splitting of the display part, and the splitting of the functional part are not mechanically split. When the display part is split into fewer display modules and each display module receives a corresponding low-frequency signal, the low-frequency signals after the corresponding high-frequency signal is split are fewer. When the low-frequency signals are fewer, the signal frequencies of the low-frequency signals are higher. Accordingly, the problem that the signal frequency of each of the split low-frequency signal is higher than the processing capability peak value of a corresponding display module. When the display part is split into more display modules, the low-frequency signals after the corresponding high-frequency signal is split are more. In one aspect, difficulty of splitting the high-frequency signal into the low-frequency signals is increased. In another aspect, difficulty of transmitting each of the split low-frequency signals to a corresponding one of the display modules and a corresponding one of the function modules is also increased. Actually, in the present disclosure, a parameter of a signal received by one of the display modules is restricted to be smaller than or equal to a processing capability peak value of the one of the display modules, and a parameter of a signal received by one of the functional modules is smaller than or equal to a processing capability peak value of the one of the functional modules, thereby achieving to match the splitting of the high-frequency signals, the splitting of the display part, and the splitting of the functional part. That is, the splitting of the high-frequency signal matches construction of the display modules and the functional modules in the display device. Furthermore, splitting the high-frequency external source signal into the low-frequency signals can adopt the conventional technology and is not described in detail in the present disclosure.

Furthermore, a fixed conversion relationship exists between a signal frequency and a signal speed. The above-mentioned high-frequency external source signal can also be referred to as a high-speed signal. The low-frequency signals after the high-frequency external source signal is split can also be referred to as low-speed signals. Splitting the high-frequency external source signal into the low-frequency signals can also be referred to as splitting the high-speed signal into the low-speed signals. For the split low-frequency signals receiving by the display modules and the functional modules, the split low-frequency signals further include relative high-frequency signals and low-frequency signals. Correspondingly, the display modules and the functional modules process the relative high-frequency signals and low-frequency signals.

Figure 1:
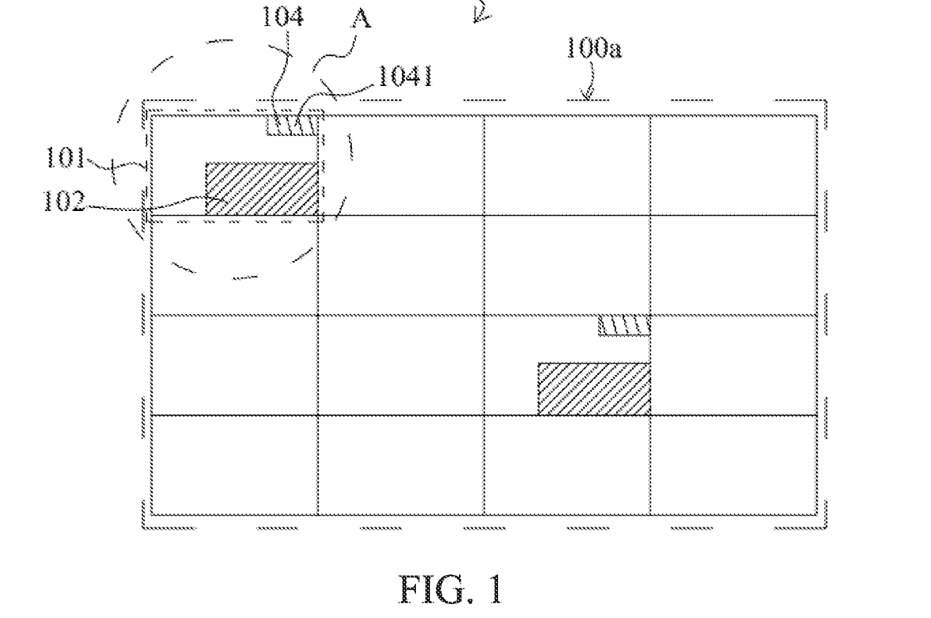
FIG. 1 illustrates a partial plan view of a display surface of a display device according to a first embodiment of the present disclosure.
Figure 2:
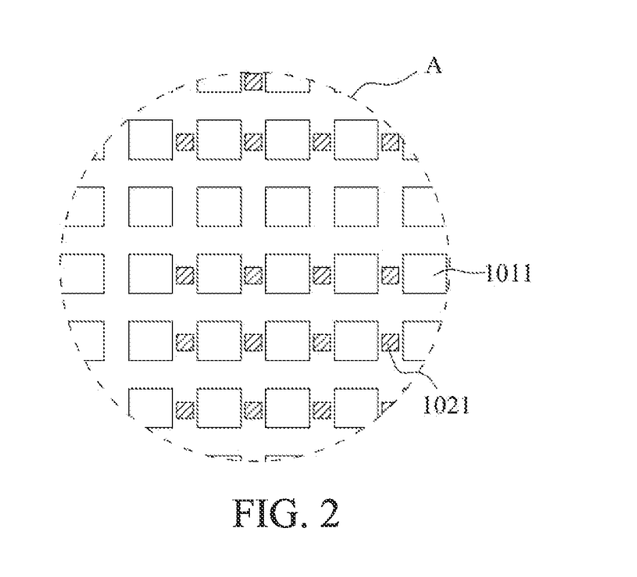
FIG. 2 illustrates a partial enlarged schematic view in an area A of the display device in FIG. 1.
Figure 3:
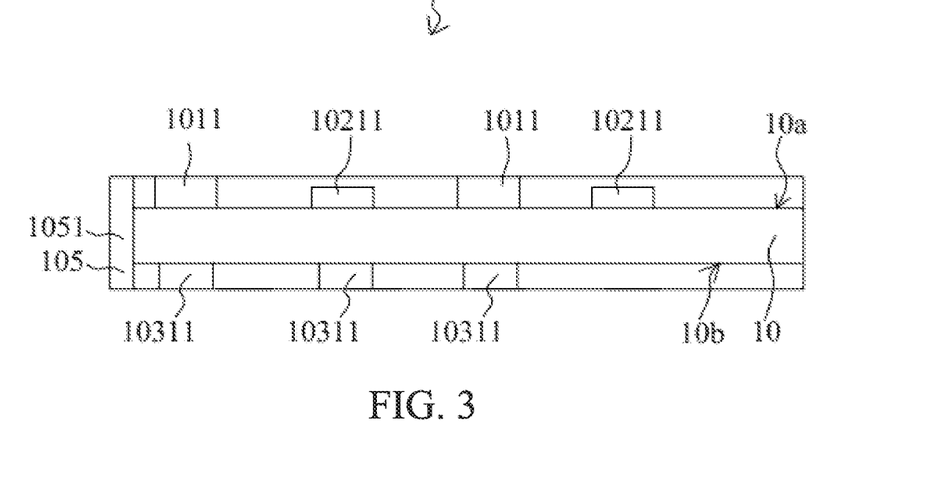
FIG. 3 illustrates a first cross-sectional schematic diagram of the display device in FIG. 1.

Please refer to FIGS. 1 to 3. FIG. 1 illustrates a partial plan view of a display surface of a display device according to a first embodiment of the present disclosure. FIG. 2 illustrates a partial enlarged schematic view in an area A of the display device in FIG. 1. FIG. 3 illustrates a first cross-sectional schematic diagram of the display device in FIG. 1. The display device 100 can be a liquid crystal display device, an organic light emitting diode display device, or a micro light emitting diode display device and is not limited herein. The display device 100 has a display area 100a. The display device 100 includes a first substrate 10, a plurality of display modules 101, a plurality of first functional elements 10211, and a plurality of second functional elements 10311.

As shown in FIG. 3, the first substrate 10 has a first bearing surface 10a and a second bearing surface 10b, and the first bearing surface 10a and the second bearing surface 10b are located on opposite sides of the first substrate 10. The first substrate 10 is a glass substrate. A thickness of the first substrate 10 is ranged from 0.1 mm to 0.25 mm. It can be understood that the first substrate 10 can also be a flexible substrate.

The display modules 101 are disposed on the first bearing surface 10a of the first substrate 10, and the display modules 101 are arranged in a matrix. Each of the display modules 101 includes a plurality of display units 1011, and the display units 1011 in each of the display modules 101 are arranged in a matrix. Each of the display units 1011 includes a light-emitting element and a pixel circuit. The pixel circuit is configured to drive the light-emitting element to emit light. The light-emitting element can be a liquid crystal cell, a micro light-emitting diode (micro-LED), a mini light-emitting diode (mini-LED), or an organic light-emitting diode and is not limited herein. The pixel circuit includes a pixel circuit element, and the pixel circuit element is selected from at least one of a thin film transistor, a capacitor, and a resistor. Specifically, the pixel circuit can adopt a 2T1C circuit, a 3T1C circuit, a 4T1C circuit, a 5T1C circuit, a 6T1C circuit, or a 7T1C circuit in the prior art. In the present embodiment, a micro-LED which is preferably used as the light-emitting element is used as an example for description.

In the present embodiment, each of the display modules 101 is configured to receive a corresponding display signal, and a parameter of the display signal is smaller than or equal to a processing capability peak value of a corresponding one of the display modules 101, so that the corresponding one of the display modules 101 can process a display signal within its processing capability range. As such, a whole distributed display device can be constituted to effectively process the high-frequency with a high resolution. The parameter of the display signal can be a value corresponding to the signal frequency of the display signal, or can be other characteristic parameters of the display signal. The processing capability peak value of the display module can be a maximum value of the signal frequency of the display signal which can be processed by a display unit with lowest processing capability among the display units constituting the display module.

When the functional part other than the display panel in the conventional display device is integrated into the display panel, a single functional device (such as a gate drive circuit or a source driver and so on) is split into a plurality of functional modules to cooperate to split the high-frequency external source signal into the low-frequency signals. Each of the functional module receives a corresponding functional signal, and a parameter of the functional signal is smaller than or equal to the processing capability peak value of the corresponding functional module, so that the functional modules are distributedly arranged on the display device to further provide a basis of processing the high-frequency signal for the display device. However, when the functional modules are integrated into the display area of the display panel, a difference of composition of the functional modules and composition of the display module is larger, a difference of composition of a single functional module is larger, and differences of the functional modules are also larger. Accordingly, difficulty of a manufacturing process technology of integrating the system into the display area of the display panel is increased. For this problem, in order to achieve better integration effect and multiplex the functional system and manufacturing process technology of the display panel to simplify the manufacturing process technology of the display device, in the present disclosure, the functional elements which can be multiplexed in manufacturing process technology of pixel circuit elements are disposed between the display units. The functional elements with the same function and the same or similar processing capabilities are manufactured on the same bearing surface by the same manufacturing process technology. The functional elements with the same function but large difference processing capabilities are manufactured on different bearing surfaces by different manufacturing process technologies. The functional modules include one or more of a source drive module, a gate driver module, a timing control module, a ROM module, a RAM module, a CPU module, an artificial (AI) smart module, an antenna module, an audio module, a sensor module, and a power supply module.

It should be noted that the functional elements with the same function and the same or similar processing capabilities can be referred to that different functional elements have the same function and have the same or similar signal processing capabilities. For example, two different functional elements are low-temperature polysilicon thin film transistors and have the same size. When they are used as switches, the two low-temperature polysilicon thin film transistors having the same or similar sizes can process the same signal and a frequency peak of the processed signal is also the same or similar. The functional elements with the same function but large difference processing capabilities can be referred to that different functional elements have the same function but have different signal processing capabilities. For example, an amorphous silicon thin film transistor and a low-temperature polysilicon thin film transistor are used as switches. A frequency peak of a signal processed by the low-temperature polysilicon thin film transistor is greater than a frequency peak of a signal of the amorphous silicon thin film transistor. The low-temperature polysilicon thin film transistor with high driving capability is configured to process analog signals, and the amorphous silicon thin film transistor with low driving capability is configured to process digital signals. Generally speaking, mobility of the amorphous silicon thin film transistor is lower than mobility of a metal oxide thin film transistor, and the mobility of the metal oxide thin film transistor is lower than mobility of the low-temperature polysilicon thin film transistor. When the mobility is greater, it is beneficial for processing the high-frequency signals. Furthermore, when the mobility is greater, the driving capability is stronger and capable of processing analog signals. Therefore, the low-temperature polysilicon thin film transistor is more suitable for processing the high-frequency signals and analog signals. In addition, for the same type of thin film transistors, when the size is larger, the driving capability is stronger and capable of processing the high-frequency signals and analog signals.

In the present embodiment, a function of each of the second functional elements 10311 is the same as a function of each of the first functional elements 10211, and processing capability of each of the second functional elements 10311 is different from processing capability of each of the first functional elements 10211. The first functional elements 10211 are located on the first bearing surface 10*a*, and each of the first functional elements 10211 is disposed between any two of the display units 1011. The second functional elements 10311 are located on the second bearing surface 10*b*.

In the present embodiment, the display device includes a plurality of first functional modules 102. The first functional modules 102 are arranged on the first bearing surface 10*a*. One of the first functional modules 102 can be arranged in a corresponding area of one of the display modules 101. Alternatively, one of the first functional modules 102 can also be arranged in the corresponding area 100*a* of the display modules 101. Alternatively, the first functional modules 102 can be arranged in a corresponding area of one of the display modules 101. In order to describe the technical solution of the present disclosure, one of the first functional modules 102 is arranged in a corresponding area corresponding of one of the display modules 101.

Each of the first functional modules 102 includes a plurality of first functional units 1021, and each of the first functional units 1021 includes at least one first functional element 10211. The first functional units 1021 can be manufactured by multiplexing manufacturing process technology of pixel circuit elements. Alternatively, a part of the first functional units 1021 can also be arranged between two adjacent display units 1011 by welding, bonding, or interface connections. Alternatively, a part of the first functional units 1021 can be manufactured by the manufacturing process technology of the pixel circuit elements, and the other part of the first functional units 1021 can be arranged between adjacent display units by welding, bonding or interface connections. The first functional element 10211 is selected from any one or more of a transistor, a resistor, an inductor, and a capacitor.

Specifically, the at least one first functional element 10211 has the same function and type as those of the pixel circuit elements, so that the pixel circuit and the first functional element 10211 are manufacturing on the first bearing surface 10*a* by the same display panel manufacturing process technology. The system is integrated in the display panel to simplify the manufacturing process technology of the display device. For example, each of the pixel circuit element and the first functional element 10211 is one of a polysilicon thin film transistor, an amorphous silicon thin film transistor, or a metal oxide thin film transistor. Alternatively, the pixel circuit element and the first functional element 10211 are amorphous silicon thin film transistors and have the same size.

In the present embodiment, each of the first functional modules 102 is a gate driver module, and each of the first functional units 1021 is a gate driver unit. Each of the gate driver units includes a plurality of thin film transistors, at least one capacitor and so on. It can be understood that each of the first functional modules 102 can also be other functional module. When composition of each of the first functional modules 102 is the same as or similar to composition of the pixel circuit, the first functional module 102 and the display module 101 are disposed on the bearing surface 10*a*.

Figure 4:
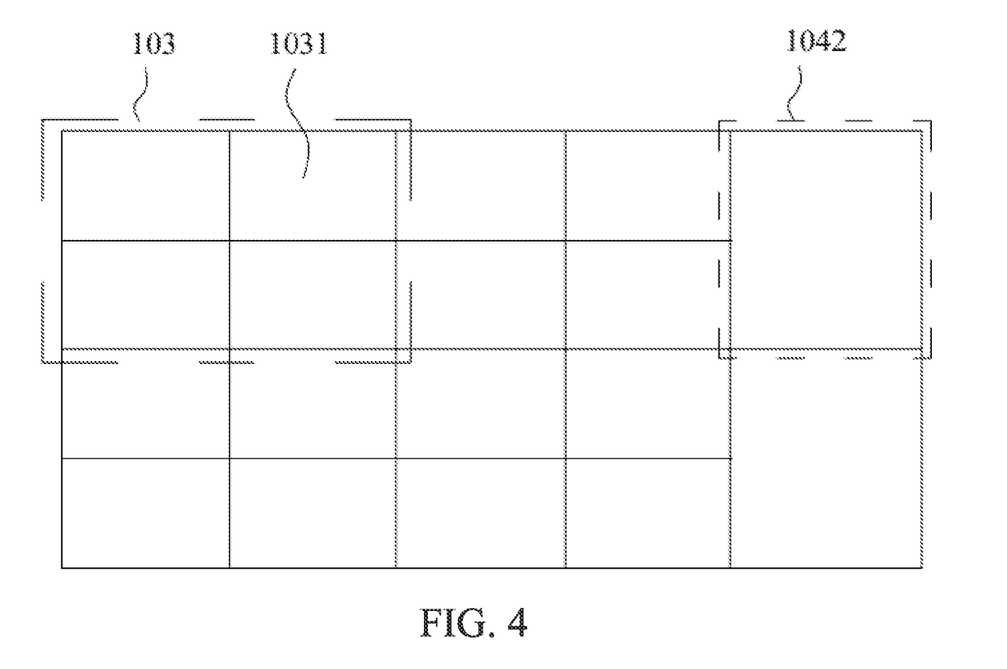
FIG. 4 illustrates a partial enlarged schematic diagram of a back surface of a display surface of the display device in FIG. 3.

FIG. 4 illustrates a partial enlarged schematic diagram of a back surface of a display surface of the display device in FIG. 3. The display device further includes a plurality of second functional modules 103. The second functional modules 103 are disposed on the second bearing surface 10*b*. The second functional modules 103 and the first functional modules 102 have different functions. Each of the second functional modules 103 includes a plurality of second functional units 1031. The second functional units 1031 can have the same function, or the second functional units 1031 can have different functions. The second functional units 1031 can be manufactured by multiplexing manufacturing process technology of a conventional display panel. Alternatively, the second functional units 1031 can be disposed on the second bearing surface 10*b* by welding, bonding or interface connections. Alternatively, a part of the second functional units 1031 can be manufactured by multiplexing the manufacturing process technology of the conventional display panel, and the other part of the second functional units 1031 can be manufactured on the second carrying surface 10*b* by welding, bonding or interface connections. Each of the second functional units 1031 includes at least one second functional element 10311. The first functional elements 10211 and the second functional elements 10311 with different processing capabilities are manufactured on different bearing surface by different manufacturing processes, thereby simplifying the manufacturing process technology of the high-resolution distributed SOP display device. In the present embodiment, one of the second functional modules 103 is an antenna module and so on. It can be understood that the second functional modules 103 can also be other functional modules.

In the present embodiment, a function of each third functional module 104 is different from the function of the first functional module 102 and the function of the second function module 103. Each of the third functional modules 104 includes a third functional unit 1041 and a fourth functional unit 1042. The third functional unit 1041 includes at least one first functional element 10211, and the fourth functional unit 1042 includes at least one second functional element 10311. Therefore, each of the third functional modules 104 includes the first functional element 10211 and the second functional element 10311. That is, when processing capabilities of different functional elements in the same functional module are different greatly, the same functional module can be manufactured on different bearing surfaces.

Specifically, the third functional modules 104 is a source driver module, the third functional unit 1041 is a latch circuit, and the fourth functional unit 1042 is a shift register circuit. The latch circuit and the shift register circuit are conventional components of the source driver. The latch circuit processes a low-frequency signal, and the shift register circuit processes a high-frequency signal. It can be understood that the third functional module 104 can also be other module.

In the present embodiment, the processing capability includes a processing capability peak value. A processing capability peak value of each of the first functional elements 10211 is different from a processing capability peak value of each of the second functional elements 10311. When the difference of the processing capability peak value of the first functional element 10211 and the processing capability peak value of the second functional element 10311 is larger, the difference of the composition of the first functional element 10211 and the composition of the second functional element 10311 is larger. Manufacturing the first functional element 10211 and the second functional element 10311 separately is more beneficial for simplifying the manufacturing process.

The processing capability peak value includes a frequency peak. A frequency peak of each of the first functional elements 10211 is different from a frequency peak of each of the second functional elements 10311. It can be understood that the processing capability peak value is not limited to the frequency peak value and can also be other peak parameter of a functional element. When the first functional element 10211 and the second functional element 10311 with different frequency peaks are respectively arranged on different bearing surfaces, the manufacturing process of the distributed SOP display device can be simplified and it is beneficial for avoiding a problem of mutual interference and coupling when the first functional element 10211 and the second functional element 10311 transmit signals with different frequencies.

In the present embodiment, at least one of the type and size of the first functional element 10211 and the second functional element 10311 is different, so that the frequency peak value of the first functional element 10211 is different from the frequency peak value of the second functional element 10311. For example, when the type of the first functional element 10211 is different from the type of the second functional element 10311, the first functional element 10211 is an amorphous silicon thin film transistor or a metal oxide thin film transistor, and the second functional element 10311 is a low-temperature polysilicon thin film transistor. Alternatively, when the type and size of the first functional element 10211 are different from and the type and size of the second functional element 10311, the first functional element 10211 is a metal oxide thin film transistor and the second functional element 10311 is a low-temperature polysilicon thin film transistor, and the size of the first functional element 10211 is different from the size of the second functional element 10311. Alternatively, the type of the first functional element 10211 is the same as the type of the second functional element 10311, but the size of the first functional element 10211 is relatively different from the type of the second functional element 10311.

Specifically, the first functional element 10211 and the second functional element 10311 are thin film transistors, and the frequency peak value of the first functional element 10211 is smaller than the frequency peak value of the second functional element 10311. The first functional element 10211 and the second functional element 10311 are amorphous silicon thin film transistors, metal oxide thin film transistors, or low-temperature polysilicon thin film transistors, and the size of the first functional element 10211 is smaller than the size of the second functional element 10311. Alternatively, the first functional element 10211 is selected from at least one of an amorphous silicon thin film transistor and a metal oxide thin film transistor, and the second functional element 10311 is a low-temperature polysilicon thin film transistor. Alternatively, the first functional element 10211 is an amorphous silicon thin film transistor, and the second functional element 10311 is selected from at least one of a metal oxide thin film transistor and a low-temperature polysilicon thin film transistor.

It should be noted that the pixel circuit and the gate driver circuit are circuits for processing low-frequency signals. Arranging the pixel circuit and the gate driver circuit on the first bearing surface is beneficial for manufacturing the pixel circuit and the gate driver circuit by the same manufacturing process technology to simplify the manufacturing process technology of the distributed SOP display device. A synchronization circuit for processing a frame synchronization signal and a row synchronization signal and a source driver split from a source driver module also process the low-frequency signals. The synchronization circuit and the latch circuit can also be distributedly arranged between the display modules. A shift register circuit in the source driver module is a circuit for processing a high-frequency signal. The shift register circuit can be arranged on a bearing surface different from the bearing surface where the display modules are located.

In other embodiments, a first signal type corresponding to the processing capability of the first functional element 10211 is different from a second signal type corresponding to the processing capability of the second functional element 10311. When the first signal type corresponding to the processing capability of the first functional element 10211 is different from the second signal type corresponding to the processing capability of the second functional element 10311, the composition of the first functional element 10211 is different from the composition of the second functional element 10311. When the first functional element 10211 and the second functional element 10311 with different compositions are manufactured separately, it can be more beneficial for simplifying the manufacturing process.

The first signal type is selected from one of a digital signal and an analog signal, and the second signal type is selected from the other of the analog signal and the digital signal. Driving capability of the functional element of processing the analog signal is greater than driving capability of the functional element of processing the digital signal. When the functional element of processing the analog signal and the functional element of processing the digital signal are manufactured on different bearing surfaces, it can be more beneficial for simplifying the manufacturing processes of the functional elements.

Specifically, the first functional element 10211 and the second functional element 10311 are thin film transistors, the first signal type is a digital signal, and the second signal type is an analog signal. The first functional element 10211 and the second functional element 10311 are amorphous silicon thin film transistors, metal oxide thin film transistors, or low-temperature polysilicon thin film transistors, and the size of the first functional element 10211 is smaller than the size of the second functional element 10311. Alternatively, the first functional element 10211 is selected from at least one of an amorphous silicon thin film transistor and a metal oxide thin film transistor, and the second functional element 10311 is a low-temperature polysilicon thin film transistor. Alternatively, the first functional element 10211 is an amorphous silicon thin film transistor, and the second functional element 10311 is selected from at least one of a metal oxide thin film transistor and a low-temperature polysilicon thin film transistor.

It should be noted that the pixel circuit and the gate driver circuit are digital circuits. The pixel circuit and the gate drive circuit process digital signals. The shift register circuit and the latch circuit in the source driver module are digital circuits. A digital-to-analog conversion circuit in the source driver module includes a digital circuit and an analog circuit, and a buffer circuit in the source driver module is an analog circuit. From the perspective of signal types, the digital circuit in the functional module is arranged between the display modules 101, and the analog circuit in the functional module is arranged on a bearing surface other than the bearing surface where the display modules 101 are located.

It should be noted that at least one of the above-mentioned first functional module 102, second functional module 103, and third functional module 104 can include a sub-functional module. The sub-functional module can be a module with an independent function. Alternatively, the sub-functional module can also be a module which includes a plurality of functional elements and does not have an independent function. The sub-functional modules can be fixed on the display device by bonding, welding or interface connections and so on. Alternatively, the sub-functional module can also be manufactured by multiplexing the manufacturing process of the display panel. When the sub-functional module is a module with an independent function, the sub-functional module can be one or more of a source driver chip, a gate driver chip, a timing control chip, a ROM chip, a RAM chip, a CPU chip, an artificial intelligence chip, an antenna chip, an audio chip, a sensor, a power chips and so on.

In the present embodiment, the display device 100 includes an electrically conductive connector 105. The electrically conductive conductor 105 is electrically connected to at least one of the second functional element 10311, the pixel circuit, and the first functional element 10211. The electrically conductive connector 105 can also be used to be electrically connected to other circuit on the first bearing surface 10a and the second bearing surface 10b.

Specifically, as shown in FIG. 3, the electrically conductive connector 105 includes an electrically conductive pad 1051. The electrically conductive pad 1051 is disposed on a side surface of the first substrate 10 and extends from the first bearing surface 10a of the first substrate 10 to the second bearing surface 10b. The electrically conductive pad 1051 is electrically connected to the pixel circuit of the display unit 1011 and the second functional element 10311. The conductive pad 1051 is also electrically connected to the first functional element 10211 and the second functional element 10311. The first functional element 10211 and the second functional element 10311 which are electrically connected to the electrically conductive pad 1051 belong to the third functional module 104. It can be understood that the first functional element 10211 and the second functional element 10311 which are electrically connected to the conductive pad 1051 can respectively belong to the first functional module 102 and the second functional module 103. The electrically conductive pad 1051 can be disposed on not only the side surface of the first substrate 10 but also multiple different side surfaces of the first substrate 10. The electrically conductive pad 1051 is prepared by the manufacturing process of the display panel. A preparation material of the electrically conductive pad 1051 is selected from at least one of molybdenum, aluminum, titanium, copper, and silver.

Figure 5:
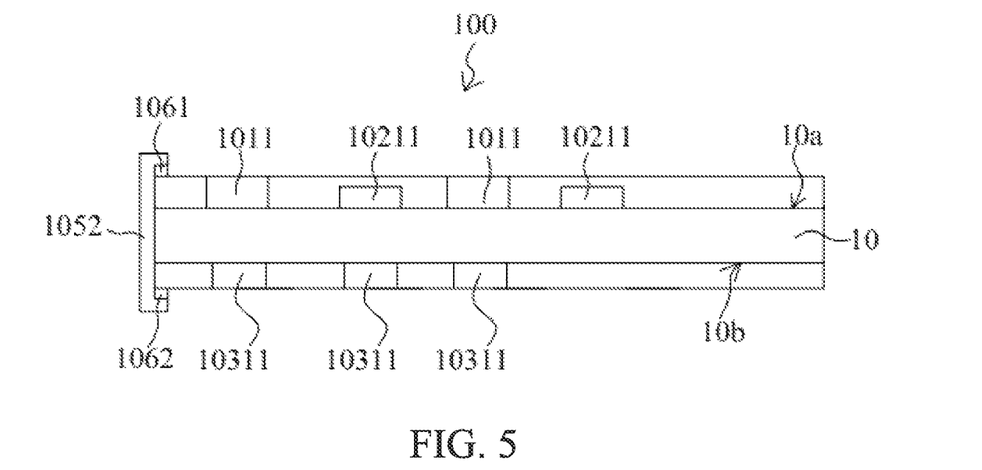
FIG. 5 illustrates a second cross-sectional schematic diagram of the display device in FIG. 1.

FIG. 5 illustrates a second cross-sectional schematic diagram of the display device in FIG. 1. The display device shown in FIG. 5 is basically similar to the display device shown in FIG. 3. A difference is that the display device 100 further includes a first pin 1061 and a second pin 1062. The first pin 1061 is disposed along a periphery of the first bearing surface 10*a*. The second pin 1062 is disposed along a periphery of the second bearing surface 10*b*. The first pin 1061 and the second pin 1062 are located at the same end of the first substrate 10. The electrically conductive connector 105 includes a flexible printed circuit board 1052. The flexible printed circuit board 1052 is located on the side surface of the first substrate 10. One end of the flexible printed circuit board 1052 is bound to the first pin 1061, and the other end of the flexible printed circuit board 1052 is bound to the second pin 1062. The first pin 1061 is electrically connected to the pixel circuit of the display unit 1011, and the second pin 1062 is electrically connected to the second functional element 10311. The flexible printed circuit board 1052 is electrically connected to the pixel circuit of the display unit 1011 on the first bearing surface 10*a* and the second functional element 10311 on the second bearing surface 10*b*. The first pin 1061 is also electrically connected to the first functional element 10211. The flexible printed circuit board 1052 is also electrically connected to the first functional element 10211 on the first bearing surface 10*a* and the second functional element 10311 on the second bearing surface 10*b*. The first functional element 10211 and the second functional element 10311 which are electrically connected to the flexible printed circuit board 1052 belong to the third functional module 104. It can be understood that the first functional element 10211 and the second functional element 10311 which are electrically connected to the flexible printed circuit board 1052 can also respectively belong to the first functional module 102 and the second functional module 103.

Compared with the electrically conductive pad 1051, the flexible printed circuit board 1052 has a lower impedance for transmitting an electrical signal. The flexible printed circuit board 1052 can transmit a signal with high electrical signal requirements, such as a power signal.

Figure 6:
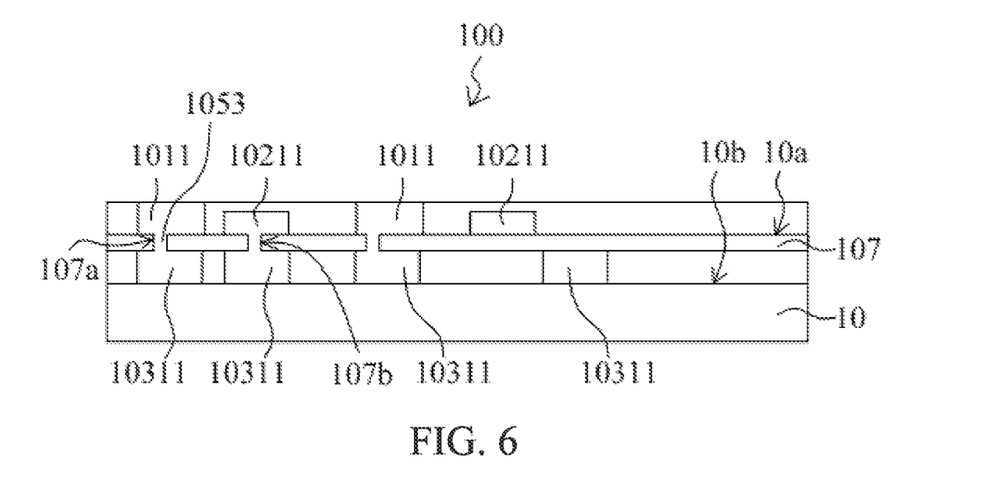
FIG. 6 illustrates a third cross-sectional schematic diagram of the display device in FIG. 1.

FIG. 6 illustrates a third cross-sectional schematic diagram of the display device in FIG. 1. The display device shown in FIG. 6 is basically similar to the display device shown in FIG. 3. A difference is that the first bearing surface 10*a* and the second bearing surface 10*b* are located on the same side of the first substrate 10, and an insulating layer 107 is disposed between the first bearing surface 10*a* and the second bearing surface 10*b*. The pixel circuit of the display unit 1011 and the second functional element 10311 are electrically connected together through a first via 107*a*. The first functional element 10211 of the third functional module 104 and the second functional element 10311 of the third functional module 104 are electrically connected together through a second via 107*b*. The electrically conductive connector 105 is disposed in the first via 107*a* and the second via 107*b*. The electrically conductive connector 105 includes an electrically conductive wire 1053. It can be understood that the first functional element 10211 of the first functional module 102 and the second functional element 10311 of the second functional module 103 can also be electrically connected together through the second via 107*b*.

In the present embodiment, the insulating layer 107 includes an organic insulating layer and/or an inorganic insulating layer. A thickness of the organic insulating layer is ranged from 1 μm to 2.5 μm. A preparation material of the organic insulating layer is selected from polyimide, polyacrylate and so on. A thickness of the inorganic insulating layer is ranged from 1000 angstroms to 5000 angstroms. A preparation material of the inorganic insulating layer is selected from at least one of silicon nitride and silicon oxide.

It can be understood that two or more bearing surfaces can be disposed on the same side of the first substrate 10. Two adjacent bearing surfaces are separated by an insulating layer. When the thickness of the insulating layer is larger, it is more beneficial for reducing mutual interference of circuits between the two adjacent bearing surfaces. Compared with the display devices shown in FIG. 3 and FIG. 5, the thickness of the insulating layer between the two adjacent bearing surfaces of the display device shown in FIG. 6 is smaller, and possibility of mutual interference between the circuits on the two bearing surfaces is higher.

As shown in FIGS. 7-13, the display device 100 can include a first substrate 10 and a second substrate 20. The first bearing surface 10*a* and the second bearing surface 10*b* are respectively located on the first substrate 10 and the second substrate 20. It can be understood that the display device 100 can also include three or more bearing surfaces, and the display device 100 can also include three or more substrates. When a number of the bearing surfaces is three, the three different bearing surfaces can be located on the same substrate, the three different bearing surfaces can be respectively located on two substrates, or the three different bearing surfaces can also be respectively located on the three substrates.

Figure 7:
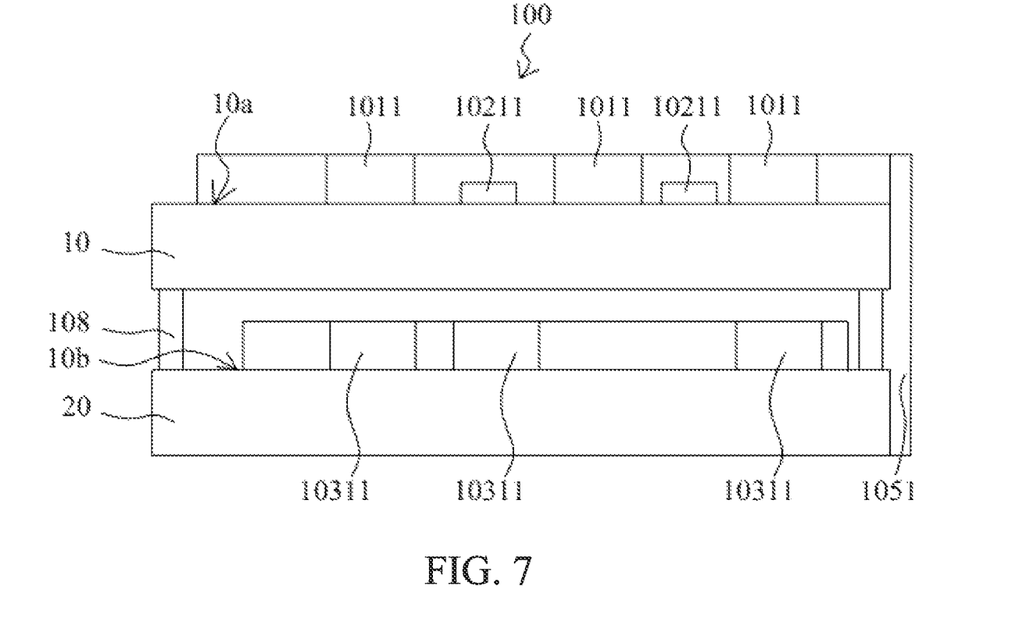
FIG. 7 illustrates a first cross-sectional schematic diagram of a display device in accordance with a second embodiment of the present disclosure.

FIG. 7 illustrates a first cross-sectional schematic diagram of a display device in accordance with a second embodiment of the present disclosure. The display device 100 shown in FIG. 7 is basically similar to the display device 100 shown in FIG. 3. Differences are described as follows. The display device includes the first substrate and the second substrate 20. The first substrate 10 is disposed opposite to the second substrate 20. The first substrate 10 is connected to the second substrate 20 by a sealant 108. The first bearing surface 10*a* and the second bearing surface 10*b* are respectively located on the first substrate 10 and the second substrate 20. The electrically conductive pad 1051 is located on the same side surface of the first substrate 10 and the second substrate 20 and extends from the first bearing surface 10*a* of the second substrate 20 to the second bearing surface 10*b*.

Specifically, the first bearing surface 10*a* is located on the first substrate 10 and on one side of the first substrate 10 away from the second substrate 20. The second bearing surface 10*b* is located on the second substrate 20, and the second bearing surface 10*b* is located on one side of the second substrate 20 close to the first substrate 10. The pixel circuit of the display unit 1011 on the first bearing surface 10*a* and the second functional element 10311 on the second bearing surface 10*b* are electrically connected together through the electrically conductive pad 1051 located on the same side surface of the first substrate 10 and the second substrate 20, and the first functional element 10211 of the third functional module 104 on the first bearing surface 10*a* and the second functional element 10311 of the third funcelectrically connected together through the electrically conductive pad 1051 located on the same side surface of the first substrate and the second substrate 20. It can be understood that the first functional element 10211 of the first functional module 102 located on the first bearing surface 10*a* and the second functional element 10311 of the second functional module 103 located on the second bearing surface 10*b* can also be electrically connected together through the conductive pad 1051 located on the same side surface of the substrate 10 and the second substrate 20.

In FIGS. 3, 5 and 6, different modules are manufactured on two bearing surfaces of the first substrate 10, there is a problem that the processes of manufacturing corresponding modules on the first bearing surface and the second bearing surface affect each other. In the display device shown in FIG. 7, corresponding modules can be respectively manufactured on the first substrate 10 and the second substrate 20. As such, a manufacturing cycle of the display can be shortened, and it can be avoided that performances of the modules manufactured on the first substrate and the second substrate 20 are affected.

Figure 8:
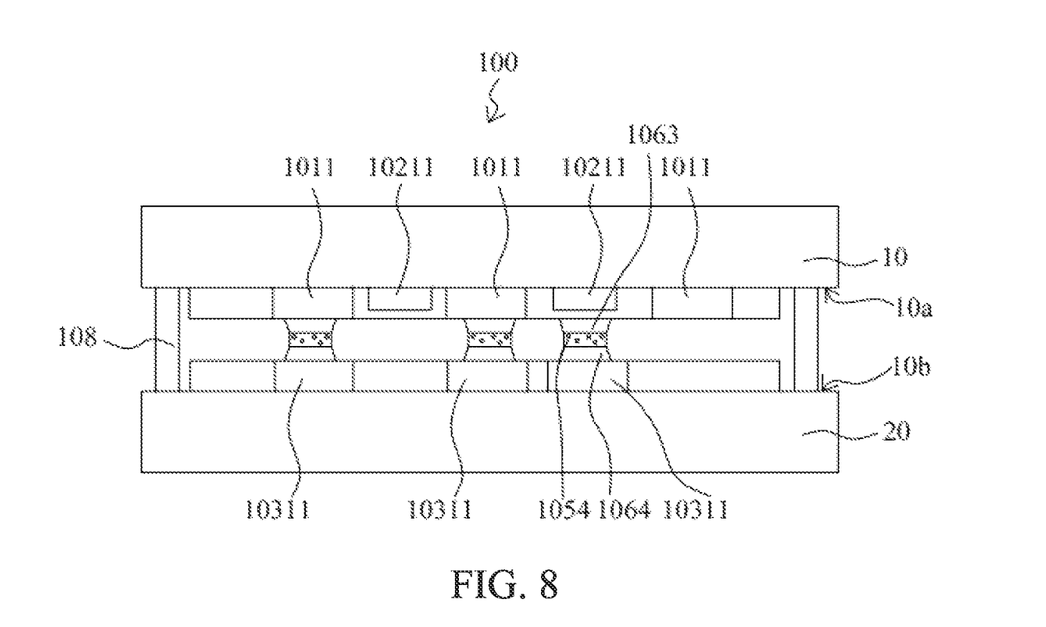
FIG. 8 illustrates a second cross-sectional schematic diagram of a display device in accordance with the second embodiment of the present disclosure.

FIG. 8 illustrates a second cross-sectional schematic diagram of a display device in accordance with the second embodiment of the present disclosure. The display device shown in FIG. 8 is basically similar to the display device shown in FIG. 7. Differences are described as follows. The first bearing surface 10*a* is located on one side of the first substrate 10 close to the second substrate 20, and the second bearing surface 10*b* is located on one side of the second substrate 20 close to the first substrate 10. The first bearing surface 10*a* faces the second bearing surface 10*b*. Further differences are described as follows. The electrically conductive connector further includes a third pin 1063 and a fourth pin 1064. The third pin 1063 is disposed on the first bearing surface 10*a* and is disposed corresponding to the display unit 1011 and a part of the first functional element 10211. The fourth pin 1064 is disposed on the second bearing surface 10*b* and is disposed corresponding to the second functional element 10311. The third pin 1063 is disposed corresponding to the fourth pin 1064. An electrically conductive adhesive 1054 is disposed between the third pin 1063 and the fourth pin 1064. The electrically conductive adhesive includes an adhesive body and electrically conductive particles. The pixel circuit of the display unit 1011 on the first bearing surface 10*a* and the second functional element 10311 on the second bearing surfaces 10*b* are electrically connected together through the electrically conductive adhesive 1054 which is pressed. The first functional element 10211 of the third functional module 104 and the second functional element 10311 of the third functional module 104 are also electrically connected together through the electrically conductive adhesive which is pressed. That is, the first functional element 10211 of the third functional module 104 and the second functional element 10311 of the third functional module 104 are electrically connected together through the electrically conductive connector disposed between the first functional element 10211 and the second functional element 10311. It can be understood that the first functional element 10211 of the first functional module 102 and the second functional element 10311 of the second functional module 103 can also be electrically connected together through the electrically conductive connector disposed between the first functional element 10211 and the second functional element 10311.

It can be seen from FIG. 8 that circuits on the two inner bearing surfaces can be electrically connected together through the electrically conductive connector formed by the pins and the electrically conductive adhesive.

Figure 9:
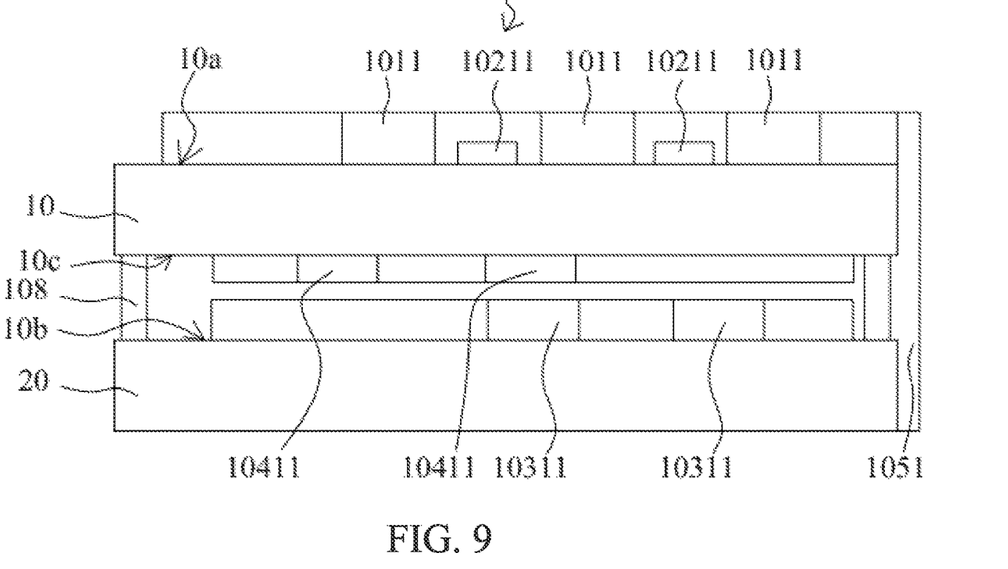
FIG. 9 illustrates a third cross-sectional schematic diagram of a display device in accordance with the second embodiment of the present disclosure.

FIG. 9 illustrates a third cross-sectional schematic diagram of a display device in accordance with the second embodiment of the present disclosure. The display device shown in FIG. 9 is basically similar to the display device shown in FIG. 7. Differences are described as follows. The display device 100 further has a third bearing surface 10*c*, and the display device 100 further includes at least one third functional element 10411. The third functional element 10411 is disposed on the third bearing surface 10*c*. A function of the third functional element 10411 is the same as the function of the first functional element 10211. Processing capability of the third functional element 10411 is different from the processing capability of the first functional element 10211 and the processing capability of the second functional element 10311.

Specifically, the first bearing surface 10*a* is located on one side of the first substrate 10 away from the second substrate 20 The second bearing surface 10*b* is located on one side of the second substrate 20 close to the first substrate 10. The third bearing surface 10*c* is located on one surface of the first substrate 10 close to the second substrate 20. The third bearing surface 10*c* faces the second bearing surface 10*b*. That is, the first bearing surface 10*a* and the third bearing surface 10*c* are located on the first substrate 10, and the second bearing surface 10*b* is located on the second substrate 20. The electrically conductive pad 1051 is located on the side surfaces of the first substrate 10 and the second substrate 20 and extends from the first bearing surface 10*a* of the first substrate 10 to be flush with one surface opposite to the second bearing surface 10*b* of the second substrate 20. The pixel circuit of the display unit 1011 on the first bearing surface 10*a* and the second functional element 10311 on the second bearing surface 10*b* are electrically connected together through the electrically conductive pad 1051. The pixel circuit of the display unit 1011 on the first bearing surface 10*a* and the third functional element 10411 on the third bearing surface 10*c* are also electrically connected together through the electrically conductive pad 1051. The first functional element 10211 on the first supporting surface 10*a* and the second functional element 10311 on the second supporting surface 10*b* can also be electrically connected together through the electrically conductive pad 1051. The third functional element 10411 on the third bearing surface 10*c*, the display unit 1011 and the first functional element 10211 on the first bearing surface 10*a*, and the second functional element 10311 on the second bearing surface 10*b* can also be electrically connected together through the electrically conductive pad 1051. It can be understood that the first bearing surface 10*a*, the second bearing surface 10*b*, and the third bearing surface 10*c* can also be respectively located on three different substrates. Alternatively, the first bearing surface 10*a*, the second bearing surface 10*b*, and the third bearing surface 10*c* are located on the same substrate. The first bearing surface 10*a* and the third bearing surface 10*c* are located on the same side of a substrate, and an insulating layer is disposed between the first bearing surface 10*a* and the third bearing surface 10*c*. The first bearing surface 10*a* and the second bearing surface 10*b* are respectively located on two opposite sides of a substrate.

It should be noted that circuits (the pixel circuit of the display unit and the first functional element) on the first bearing surface 10*a* and circuits (the second functional element) on the second bearing surface 10*b*, and circuits (the third functional element 10411) on the third bearing surface 10*c* can be electrically connected together through a plurality of electrically conductive pads 1051. The electrically conductive pads 1051 can be located on one side or multiple sides of the first substrate 10 and the second substrate 20.

Figure 10:
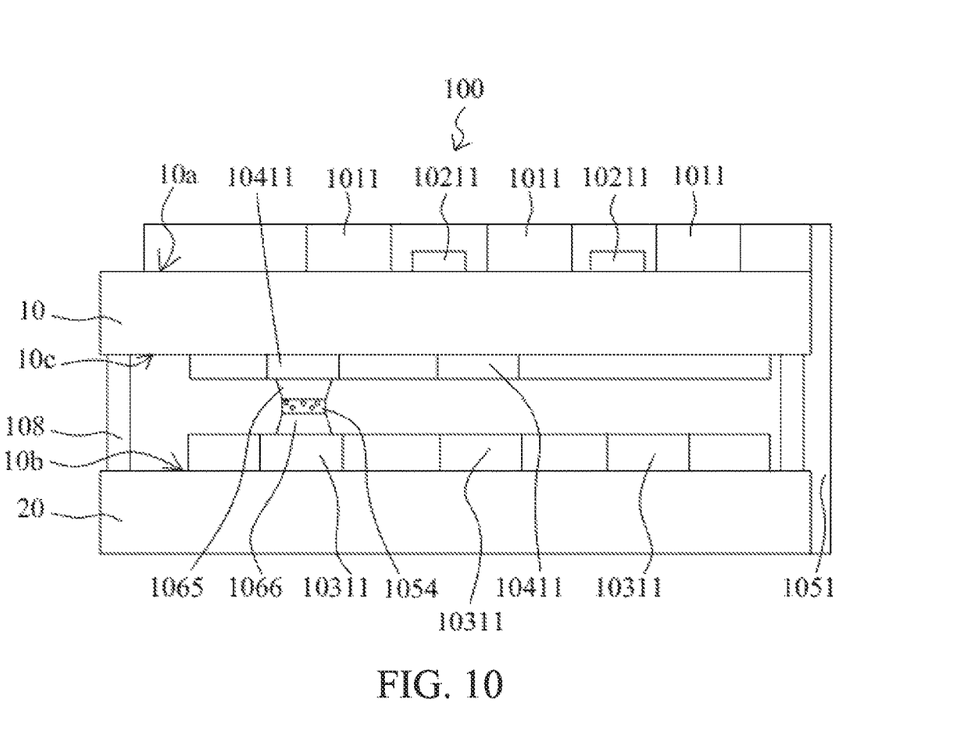
FIG. 10 illustrates a fourth cross-sectional schematic diagram of a display device in accordance with the second embodiment of the present disclosure.

FIG. 10 illustrates a fourth cross-sectional schematic diagram of a display device in accordance with the second embodiment of the present disclosure. The display device shown in FIG. 10 is basically similar to the display device shown in FIG. 9. Differences are described as follows. A fifth pin 1065 is disposed on the third bearing surface 10c and is disposed corresponding to the third functional element 10411. The fifth pin 1065 is electrically connected to the third functional element 10411. A sixth pin 1066 is disposed on the second bearing surface 10b and is disposed corresponding to the second functional element 10311. The sixth pin 1066 is electrically connected to the second functional element 10311. The fifth pin 1065 is disposed corresponding to the sixth pin 1066. An electrically conductive adhesive 1054 is disposed between the fifth pin 1065 and the sixth pin 1066. The second functional element 10311 on the second bearing surface 10b and the third functional element 10411 on the third bearing surface 10c are electrically connected together through the electrically conductive adhesive which is pressed.

Figure 11:
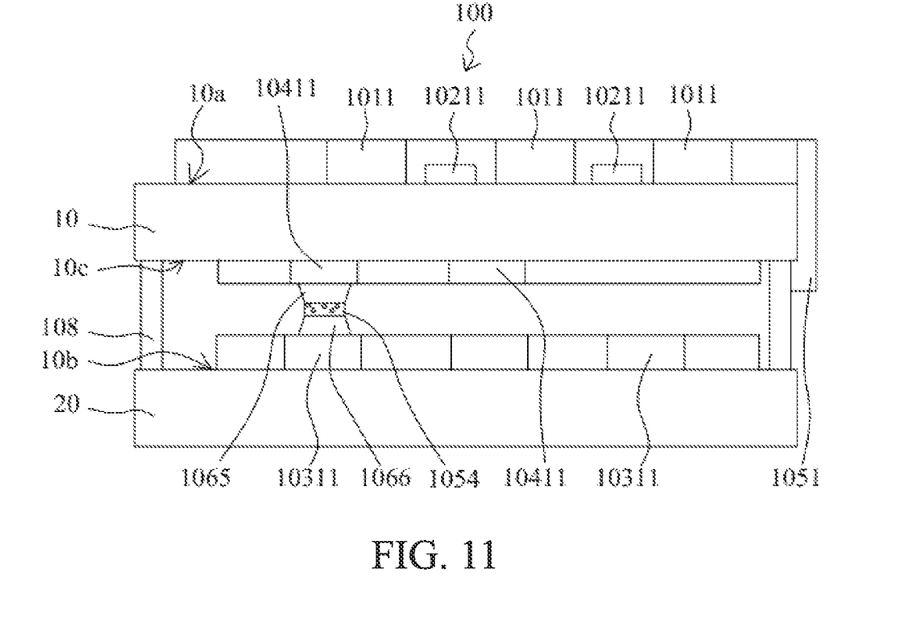
FIG. 11 illustrates a fifth cross-sectional schematic diagram of a display device in accordance with the second embodiment of the present disclosure.

FIG. 11 illustrates a fifth cross-sectional schematic diagram of a display device in accordance with the second embodiment of the present disclosure. The display device 100 shown in FIG. 11 is basically similar to the display device shown in FIG. 10. Differences are described as follows. The electrically conductive pad 1051 is only disposed on one side of the first substrate 10 and extends from the first bearing surface 10a of the first substrate 10 to the third bearing surface 10c of the first substrate. The electrically conductive pad 1051 is only electrically connected to the pixel circuit of the display unit and the first functional element 1011 on the first bearing surface 10a and the third functional element 10411 on the third bearing surface 10c.

Figure 12:
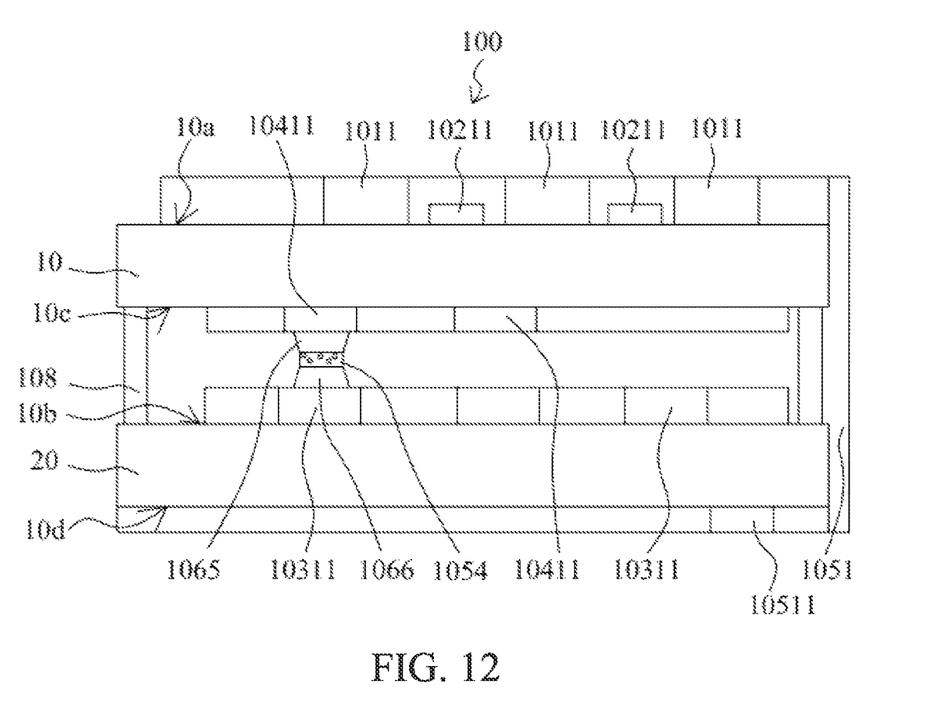
FIG. 12 illustrates a sixth cross-sectional schematic diagram of a display device in accordance with the second embodiment of the present disclosure.

FIG. 12 illustrates a sixth cross-sectional schematic diagram of a display device in accordance with the second embodiment of the present disclosure. The display device shown in FIG. 12 is basically similar to the display device shown in FIG. 10. Differences are described as follows. The display device 100 further includes a fourth bearing surface 10d. The display device further includes a fourth functional element 10511. Processing capability of the fourth functional element 10511 is different from the processing capability of the first functional element 10211, the processing capability of the second functional element 10311, and the processing of the third functional element 10411. The fourth bearing surface 10d is arranged on one side of the second substrate 20 away from the first substrate 10. The fourth functional element 10511 is disposed on the fourth bearing surface 10d. The electrically conductive pad 1051 is located on one sides of the first substrate 10 and the second substrate 20 and extends from the first bearing surface 10a of the first substrate 10 to the fourth bearing surface 10d of the second substrate 20. The electrically conductive pad 1051 can also be used to be electrically connected to the pixel circuit and the first functional element of the display unit 1011 on the first bearing surface 10a and the fourth functional element 10511 on the fourth bearing surface 10d.

Figure 13:
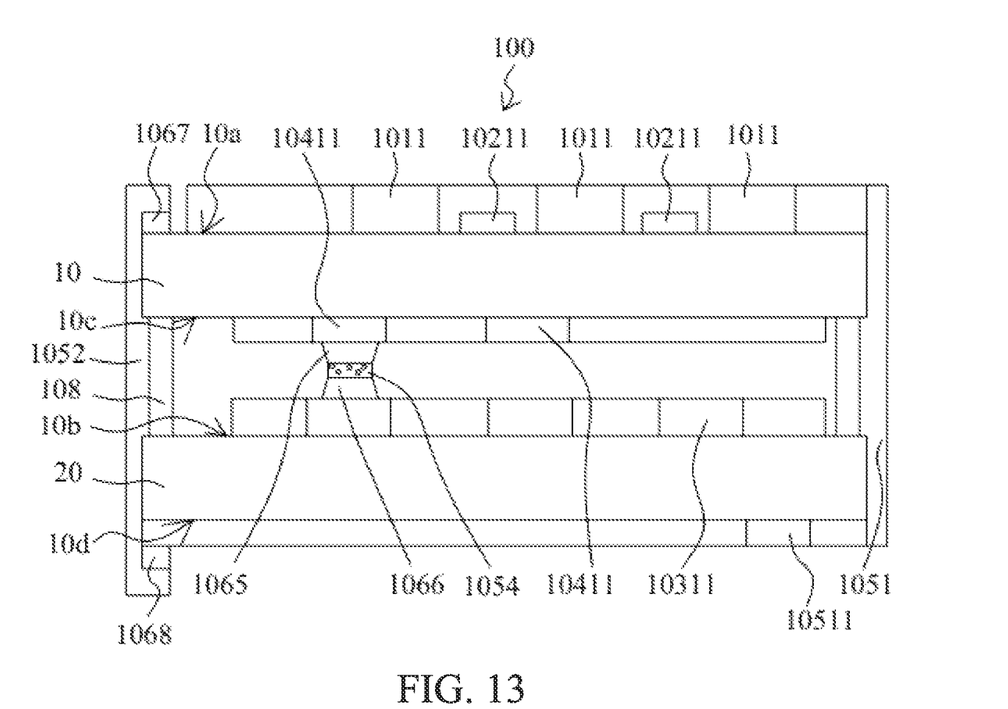
FIG. 13 illustrates a seventh cross-sectional schematic diagram of a display device in accordance with the second embodiment of the present disclosure.

FIG. 13 illustrates a seventh cross-sectional schematic diagram of a display device in accordance with the second embodiment of the present disclosure. The display device shown in FIG. 13 is basically similar to the display device shown in FIG. 12. Differences are described as follows. A seventh pin 1067 is disposed along a periphery of the first bearing surface 10a, and an eighth pin is disposed along a periphery of the fourth bearing surface 10d. One end of the flexible printed circuit board 1052 is bound to the seventh pin 1067, and the other end of the flexible printed circuit board 1052 is bound to the eighth pin 1068. The seventh pin 1067 is electrically connected to the pixel circuit of the display unit 1011 or the first functional element 10211. The eighth pin 1068 is electrically connected to the fourth functional element 10511. The flexible printed circuit board 1052 is electrically connected to the pixel circuit of the display unit 1011 and the first functional element 10211 on the first bearing surface 10a and the fourth functional element 10511 on the fourth bearing surface 10d. Furthermore, the flexible printed circuit board 1052 and the electrically conductive pad 1051 are disposed on different sides of the display device.

The descriptions of the above-mentioned embodiments are only used to facilitate understanding of the technical solutions and core ideas of the present disclosure. Those skilled in the art should understand that they may still make modifications to the technical solutions described in the above-mentioned embodiments or make equivalent replacements to some technical features thereof. These modifications or equivalent replacements do not depart from the spirit and scope of the technical solutions of the embodiments of the present disclosure.

What is claimed is:

1. A display device, wherein the display device has a first bearing surface and a second bearing surface, the display device comprises:
    a plurality of display modules disposed on the first bearing surface, each of the display modules configured to receive a corresponding display signal, a parameter of the display signal being smaller than or equal to a processing capability peak value of a corresponding one of the display modules, and each of the display modules comprising a plurality of display units;
    a plurality of first functional elements located on the first bearing surface, and each of the first functional elements disposed between any two of the display units; and
    a plurality of second functional elements located on the second bearing surface;
    wherein a function of each of the second functional elements is the same as a function of each of the first functional elements, and processing capability of each of the second functional elements is different from processing capability of each of the first functional elements;
    wherein the display device comprises a first substrate, the first bearing surface and the second bearing surface are located on two opposite sides of the first substrate; or the first bearing surface and the second bearing surface are located on the same side of the first substrate, and an insulating layer is disposed between the first bearing surface and the second bearing surface.

2. The display device of claim 1, wherein the processing capability includes a processing capability peak value, and a processing capability peak value of each of the first functional elements is different from a processing capability peak value of each of the second functional elements.

3. The display device of claim 2, wherein the processing capability peak value includes a frequency peak, and a frequency peak of each of the first functional elements is different from a frequency peak of each of the second functional elements.

4. The display device of claim 3, wherein each of the first functional elements and each of the second functional elements are thin film transistors, and the frequency peak value of each of the first functional elements is smaller than the frequency peak value of each of the second functional elements;

each of the first functional elements and each of the second functional elements are amorphous silicon thin film transistors, metal oxide thin film transistors, or low-temperature polysilicon thin film transistors, and a size of each of the first functional elements is smaller than a size of each of the second functional elements;

each of the first functional elements is selected from at least one of an amorphous silicon thin film transistor and a metal oxide thin film transistor, and each of the second functional elements is a low-temperature polysilicon thin film transistor; or     each of the first functional elements is an amorphous silicon thin film transistor, and each of the second functional elements is selected from at least one of a metal oxide thin film transistor and a low-temperature polysilicon thin film transistor.

5. The display device of claim 1, wherein a first signal type corresponding to the processing capability of each of the first functional elements is different from a second signal type corresponding to the processing capability of each of the second functional elements.

6. The display device of claim 5, wherein the first signal type is selected from one of an analog signal and a digital signal, and the second signal type is selected from the other of the analog signal and the digital signal.

7. The display device of claim 6, wherein each of the first functional elements and each pf the second functional elements are thin film transistors, the first signal type is the digital signal, and the second signal type is the analog signal;

each of the first functional element and each of the second functional elements are amorphous silicon thin film transistors, metal oxide thin film transistors, or low-temperature polysilicon thin film transistors, and a size of each of the first functional elements is smaller than a size of each of the second functional elements;

each of the first functional elements is selected from at least one of an amorphous silicon thin film transistor and a metal oxide thin film transistor, and each of the second functional elements is a low-temperature polysilicon thin film transistor; or     each of the first functional elements is an amorphous silicon thin film transistor, and each of the second functional elements is selected from at least one of a metal oxide thin film transistor and a low-temperature polysilicon thin film transistor.

8. The display device of claim 1, wherein at least one of a type and a size of each of the first functional elements and each of the second functional elements is different.

9. The display device of claim 1, wherein the display device further comprises an electrically conductive connector;

the first bearing surface and the second bearing surface are respectively located on the two opposite sides of the first substrate, and the electrically conductive connector is disposed on a side surface of the first substrate; or     the first bearing surface and the second bearing surface are located on the same side of the first substrate, the insulating layer is disposed between the first bearing surface and the second bearing surface, at least one via is disposed in the insulating layer, the electrically conductive connector is disposed in the at least one via, and the electrically conductive connector is electrically connected to at least one of the first functional elements and at least one of the second functional elements.

10. The display device of claim 9, wherein the display device comprises a plurality of first functional modules and a plurality of second functional modules, the first functional modules and the second functional modules have different functions, each of the first functional modules comprises at least one of the first functional elements, and each of the second functional modules comprises at least one of the second functional elements.

11. The display device of claim 10, wherein the second functional modules are disposed on the second bearing surface.

12. The display device of claim 9, wherein the display device further comprises a plurality of third functional modules, and each of the third functional modules comprises at least one of the first functional elements and at least one of the second functional elements.

13. The display device of claim 1, wherein each of the display units comprises a pixel circuit element, the pixel circuit element and at least one of the first functional elements have the same function and the same types.

14. The display device of claim 1, wherein each of the first functional elements is selected from any one or more of a transistor, a resistor, an inductor, and a capacitor.

15. A display device, wherein the display device has a first bearing surface and a second bearing surface, the display device comprises:

a plurality of display modules disposed on the first bearing surface, each of the display modules configured to receive a corresponding display signal, a parameter of the display signal being smaller than or equal to a processing capability peak value of a corresponding one of the display modules, and each of the display modules comprising a plurality of display units;

a plurality of first functional elements located on the first bearing surface, and each of the first functional elements disposed between any two of the display units; and     a plurality of second functional elements located on the second bearing surface;

wherein a function of each of the second functional elements is the same as a function of each of the first functional elements, and processing capability of each of the second functional elements is different from processing capability of each of the first functional elements;

wherein the display device comprises a first substrate and a second substrate, and the first bearing surface and the second bearing surface are respectively located on the first substrate and the second substrate, wherein the first substrate is disposed opposite to the second substrate, the display device further comprises an electrically conductive connector;

wherein the first bearing surface is located on one side of the first substrate close to the second substrate, the second bearing surface is located on one side of the second substrate close to the first substrate, and the electrically conductive connector is disposed between at least one of the first functional elements and at least one of the second functional elements and is electrically connected to the at least one of the first functional elements and the at least one of the second functional elements; or the first bearing surface is located on one side of the first substrate away from the second substrate, the second bearing surface is located on one side of the second substrate, and the electrically conductive connector is disposed one the same side of the first substrate and the second substrate and is electrically connected to at least one of the first functional elements and at least one of the second functional elements.

16. The display device of claim 15, wherein the processing capability includes a processing capability peak value, and a processing capability peak value of each of the first functional elements is different from a processing capability peak value of each of the second functional elements.

17. The display device of claim 16, wherein the processing capability peak value includes a frequency peak, and a frequency peak of each of the first functional elements is different from a frequency peak of each of the second functional elements.

18. The display device of claim 17, wherein each of the first functional elements and each of the second functional elements are thin film transistors, and the frequency peak value of each of the first functional elements is smaller than the frequency peak value of each of the second functional elements;

each of the first functional elements and each of the second functional elements are amorphous silicon thin film transistors, metal oxide thin film transistors, or low-temperature polysilicon thin film transistors, and a size of each of the first functional elements is smaller than a size of each of the second functional elements;

each of the first functional elements is selected from at least one of an amorphous silicon thin film transistor and a metal oxide thin film transistor, and each of the second functional elements is a low-temperature polysilicon thin film transistor; or each of the first functional elements is an amorphous silicon thin film transistor, and each of the second functional elements is selected from at least one of a metal oxide thin film transistor and a low-temperature polysilicon thin film transistor.

19. The display device of claim 15, wherein a first signal type corresponding to the processing capability of each of the first functional elements is different from a second signal type corresponding to the processing capability of each of the second functional elements.

* * * * *